United States Patent [19]

Asada et al.

[11] Patent Number: 4,916,980

[45] Date of Patent: Apr. 17, 1990

[54] PLANETARY GEAR TYPE SPEED CHANGE DEVICE TO PROVIDE SIX FORWARD SPEED STAGES WITH TWO SINGLE PINION TYPE SIMPLE PLANETARY GEAR MECHANISMS

[75] Inventors: Toshiyuki Asada, Susono; Fumihiro Ushijima, Okazaki; Yasuhiko Higashiyama; Toshitake Suzuki, both of Susono, all of Japan

[73] Assignee: Toyota Jidosha Kabushiki Kaisha, Aichi, Japan

[21] Appl. No.: 220,801

[22] Filed: Jul. 18, 1988

[30] Foreign Application Priority Data

Jul. 22, 1987 [JP] Japan ................. 62-183030
Jun. 6, 1988 [JP] Japan ................. 63-138698
Jun. 10, 1988 [JP] Japan ................. 63-144518

[51] Int. Cl.⁴ ............................................. F16H 57/10
[52] U.S. Cl. ............................................. 475/281
[58] Field of Search ............... 74/758, 759, 762, 763, 74/766, 767

[56] References Cited

U.S. PATENT DOCUMENTS

| 3,067,632 | 12/1962 | Foerster et al. ............ 74/759 |
| 3,483,771 | 12/1969 | Forster et al. ............. 74/767 |
| 3,811,343 | 5/1974 | Mori et al. ............... 74/759 |
| 3,956,946 | 5/1976 | Murakomi et al. ........... 74/759 |
| 3,971,268 | 7/1976 | Murakami et al. ......... 74/767 X |
| 4,086,827 | 5/1978 | Chana .................... 74/759 |
| 4,483,215 | 1/1984 | Ishimaru et al. ........... 74/759 |
| 4,607,541 | 8/1986 | Miura et al. .............. 74/758 |
| 4,793,215 | 12/1988 | Sugano ................... 74/758 |

FOREIGN PATENT DOCUMENTS

| 2939724 | 5/1980 | Fed. Rep. of Germany . |
| 925319 | 9/1947 | France . |
| 2283364 | 3/1976 | France . |
| 48-27863 | 8/1973 | Japan . |
| 50-32913 | 10/1975 | Japan . |
| 0134048 | 8/1982 | Japan ................. 74/759 |
| 60-125445 | 7/1985 | Japan . |
| 61-117950 | 7/1986 | Japan . |
| 2049074 | 12/1980 | United Kingdom . |
| 1601793 | 11/1981 | United Kingdom ....... 74/759 |

Primary Examiner—Dwight G. Diehl
Assistant Examiner—Chris Campbell
Attorney, Agent, or Firm—Oliff & Berridge

[57] ABSTRACT

A planetary gear type speed change device having two simple planetary gear mechanisms positioned axially adjacent with one another with each carrier thereof being connected with each ring gear of the other, three clutches and three brakes assembled together between an input rotational member and an output rotational member so as to provide six monotonously changing gear ratios between the input and the output rotational members according to combinations of engagement and disengagement of the three clutches and the three brakes.

7 Claims, 12 Drawing Sheets

| | C1 | C2 | C3 | B1 | B2 | B3 | GEAR RATIO | |
|---|---|---|---|---|---|---|---|---|
| 1st | ○ | | | ○ | | | $(r1+r2+r1 \cdot r2)/r1$ | 3.333 |
| 2nd | | ○ | | | ○ | | $(1+r2)/r2$ | 2.449 |
| 3rd | | ○ | | | | ○ | $(r1+r2+r1 \cdot r2)/r2(1+r1)$ | 1.429 |
| 4th | | ○ | ○ | | | | 1 | 1 |
| 5th | | | ○ | | | ○ | $1/(1+r1)$ | 0.704 |
| Rev | ○ | | | | ○ | | $-1/r1$ | −2.381 |

|  |  | C1 | C2 | C3 | B1 | B2 | B3 | F1 | F2 | GEAR RATIO |  |
|---|---|---|---|---|---|---|---|---|---|---|---|
|  | P |  |  |  |  |  |  |  |  | — | — |
|  | R | O |  |  |  | O |  | (O) |  | $-1/r_1$ | −2.381 |
|  | N |  |  |  | [O] |  |  |  |  | — | — |
| D | 1st | O |  |  | O |  |  |  | O | $(r_1+r_2+r_1 \cdot r_2)/r_1$ | 3.333 |
|  | 2nd |  | O |  | [O] | (O) |  | O |  | $(1+r_2)/r_2$ | 2.449 |
|  | 3rd |  | O |  | [O] |  | O |  |  | $(r_1+r_2+r_1 \cdot r_2)/r_2(1+r_1)$ | 1.429 |
|  | 4th |  | O | O | [O] |  |  |  |  | 1 | 1 |
|  | 5th |  |  | O | [O] |  | O |  |  | $1/(1+r_1)$ | 0.704 |

FIG. 20

| A | B | C | D | E | F |
|---|---|---|---|---|---|
| C₁ | 1st | ⤨ | 1→2' | ⤨ | |
| | 4th | ⤨ | 4⇌5<br>4⇌3<br>4⇌2 | ⤨ | ⤨ ⤨ ⤨<br>⤨ ⤨ ⤨ |
| | | ⤨ | 4⇌5<br>4⇌3<br>4⇌2 | ⤨ | |
| | | ⤨ | 4⇌2' | ⤨ | |
| | Rev | ⤨ | | ⤨ | |
| C₂ | 2nd | ⤨ | 2⇌5 | ⤨ | |
| | 3rd | ⤨ | 3⇌5 | ⤨ | ⤨ ⤨ |
| | 4th | ⤨ | 4→5 | ⤨ | |
| C₃ | 4th | ⤨ | | ⤨ | |
| | 5th | ⤨ | | ⤨ | ⤨ ⤨ |
| | 2'nd | ⤨ | | ⤨ | |
| B₁ | 1st | ⤨ | 1⇌2<br>1⇌3<br>1⇌4<br>1⇌5 | ⤨ | ⤨ ⤨ ⤨ |
| | 2'nd | ⤨ | 2'⇌2<br>2'⇌3<br>2'⇌4<br>2'⇌5 | ⤨ | |
| B₂ | 2nd | ⤨ | 2⇌1<br>2⇌3<br>2⇌4<br>2⇌5<br>2⇌2' | ⤨ | ⤨ ⤨ ⤨<br>⤨ ⤨ |
| | Rev | ⤨ | | ⤨ | |
| B₃ | 3rd | ⤨ | 3⇌1<br>3⇌4<br>3⇌2' | ⤨ | ⤨ ⤨ ⤨<br>⤨ ⤨ |
| | 5th | ⤨ | 5⇌3 | ⤨ | |

PLANETARY GEAR TYPE SPEED CHANGE DEVICE TO PROVIDE SIX FORWARD SPEED STAGES WITH TWO SINGLE PINION TYPE SIMPLE PLANETARY GEAR MECHANISMS

BACKGROUND OF THE INVENTION

1. Field of the Invention

The present invention relates to a planetary gear type speed change device for use in an automatic transmission for a vehicle such as an automobile.

2. Description of the Prior Art

Planetary gear type speed change devices adapted for use in an automatic transmission for a vehicle and operable to provide five or six forward speed stages have been proposed in the forms of a combination of a double pinion type simple planetary gear mechanism and a Ravingeau type planetary gear mechanism (Japanese Patent Publication 48-27863 (1972)), a combination of three single pinion type simple planetary gear mechanisms (Japanese Patent Publication 50-32913 (1975)) and a combination of a double pinion type simple planetary gear mechanism and a single pinion type simple planetary gear mechanism (Japanese Patent Laying-open Publication 61-117950 (1986)).

When the speed change device can provide a larger number of forward speed stages, the difference between the rotational speed of the pump and the turbine of the fluid torque converter during the speed stage shifting becomes smaller, and thereby the power transmission efficiency of the torque converter is correspondingly increased, and the fuel economy of the vehicle is correspondingly improved. Further, if the rotational speed difference between the pump and the turbine of the fluid torque converter during the speed stage shifting becomes smaller, the shock which would occur during the speed stage shifting will also be reduced.

From the above view point it is desirable that the speed change device can provide a larger number of forward speed stages without increasing the overall speed change ratio between the lowest forward speed stage and the highest forward speed stage.

However, the speed change device generally becomes more complicated in the structure requiring more clutches and/or brakes when it is designed to provide a larger number of speed stages, resulting in an increase of the weight and the cost of the speed change device.

SUMMARY OF THE INVENTION

The object of the present invention is to provide a planetary gear type speed change device which can provide a large number of speed stages (in fact, six forward speed stage and a reverse stage) based upon a combination of two single pinion type simple planetary gear mechanism without particularly increasing the number of friction engaging devices such as clutches and brakes and without particularly increasing the overall complexity and size of the device.

According to the present invention, the above-mentioned object is accomplished by a planetary gear type speed change device comprising:
a case;
an input rotational member;
an output rotational member;
a first planetary gear mechanism having a first sun gear, first planetary pinions, a first ring gear and a first carrier;
a second planetary gear mechanism having a second sun gear, second planetary pinions, a second ring gear and a second carrier;
a first connecting member connecting said first carrier with said second ring gear;
a second connecting member connecting said second carrier with said first ring gear;
a first clutch for selectively connecting said first sun gear with said input rotational member;
a second clutch for selectively connecting said second sun gear with said input rotational member;
a third clutch for selectively connecting the combination of said first carrier and said second ring gear by said first connecting member with said input rotational member;
a first brake for selectively braking said second sun gear with respect to said case;
a second brake for selectively braking the combination of said first carrier and said second ring gear by said first connecting member with respect to said case; and
a third brake for selectively braking said first sun gear with respect to said case,
said output rotational member being connected with the combination of said second carrier and said first ring gear by said second connecting member.

The planetary gear type speed change device according to the present invention may further comprise a one-way brake for selectively braking the combination of said first carrier and said second ring gear by said first connecting member with respect to said case in a forward rotational direction while slipping in a reversed rotational direction opposite to said forward rotational direction.

The planetary gear type speed change device according to the present invention may further comprise a one-way brake disposed in series with said first brake between said first brake and said second sun gear so as to selectively brake said second sun gear with respect to said case in a forward rotational direction when said first brake is engaged while slipping in a reversed rotational direction opposite to said forward rotational direction.

In the above-mentioned planetary gear type speed change device, it is desirable that said first planetary gear mechanism and said second planetary gear mechanism are positioned axially adjacent with one another along a central axis of the speed change device, said first clutch and said third clutch are positioned on one axial side of said first planetary gear mechanism remote from said second planetary gear mechanism, and said second clutch, said first brake and said second one-way brake are positioned as a sub-assembly on one axial side of said second planetary gear mechanism remote from said first planetary gear mechanism, said input rotational member including a shaft portion extending along said central axis from said one side of said first planetary gear mechanism remote from said second planetary gear mechanism to said one side of said second planetary gear mechanism remote from said first planetary gear mechanism.

In the above-mentioned planetary gear type speed change device it is desirable that said output rotational member is an annular member positioned coaxially about said shaft portion of said input rotational member between said second planetary gear mechanism and said sub-assembly of said second clutch, said first brake and said second one-way brake.

In the above-mentioned planetary gear type speed change device it is desirable that said case includes a first case unit for enclosing therein said first and second planetary gear mechanisms, said first and third clutches, said second and third brakes and said first one-way brake, and a second case unit for enclosing therein said sub-assembly of said second clutch, said first brake and said second one-way brake, said second case unit being detachably mounted to an adjacent axial end of said first case unit.

BRIEF DESCRIPTION OF THE DRAWINGS

In the accompanying drawings;

FIG. 20 is a list showing modifications applicable to the clutches and the brakes in the speed change devices shown in FIGS. 1 and 11.

DESCRIPTION OF THE PREFERRED EMBODIMENT

The present invention will now be described in terms of the preferred embodiments thereof with reference to the accompanying drawings.

Figures 1, 2:
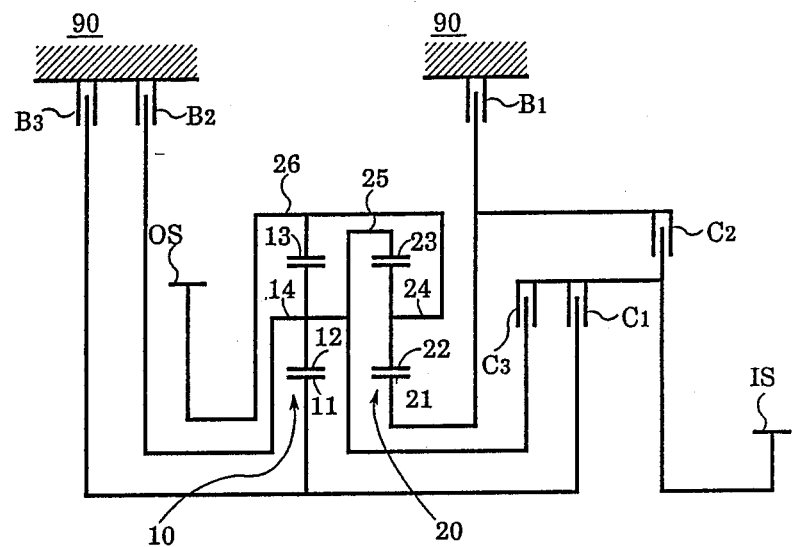
FIG. 1 is a diagrammatical view of a first embodiment of the planetary gear type speed change device according to the present invention.
FIG. 2 is a table showing the operating conditions of the clutches and the brakes incorporated in the speed change device shown in Fig. with the gear ratios available thereby.

Referring to FIG. 1, IS is an input rotational member and OS is an output rotational member. These input and output rotational members are disposed along a common axis. 10 and 20 designate a first and a second simple planetary gear mechanism as a whole, respectively. These planetary gear mechanisms are disposed along the common axis of the input and output rotational members IS and OS.

The input rotational member IS is adapted to be driven by a motor such as an internal combustion engine via a fluid torque converter, an electromagnetic clutch or the like.

The output rotational member OS has an output gear wheel which is adapted to drive a conventional differential device not shown in the figure.

The first planetary gear mechanism 10 has a sun gear 11, planetary pinions 12 (only one is shown) a ring gear 13 and a carrier 14. The second planetary gear mechanism 20 has a sun gear 21, planetary pinions 22 (only one shown), a ring gear 23 and a carrier 24. The carrier 14 of the first planetary gear mechanism 10 is connected with the ring gear 23 of the second planetary gear mechanism 20 by a connecting member 25, and the ring gear 13 of the first planetary gear mechanism 10 is connected with the carrier 24 of the second planetary gear mechanism 20 by a connecting member 26. The output rotational member OS is connected with the combination of the ring gear 13 and the carrier 24 by the connecting member 26.

The speed change device according to the present invention has three clutches C1, C2 and C3 and three brakes B1, B2 and B3. The clutch C1 selectively connects the sun gear 11 with the input rotational member IS. The clutch C2 selectively connects the sun gear 21 with the input rotational member IS. The clutch C3 selectively connects the combination of the carrier 14 and the ring gear 23 by the connecting member 25 with the input rotational member IS.

The brake B1 selectively brakes the sun gear 21 with respect to a transmission case 90. The brake B2 selectively brakes the combination of the carrier 14 and the ring gear 23 by the connecting member 25 with respect to the transmission case 90. The brake B3 selectively brakes the sun gear 11 with respect to the transmission case 90.

The planetary gear type speed change device having the above-mentioned structure can provide a first speed stage, a second speed stage, a third speed stage, a fourth speed stage (direct drive stage), a fifth speed stage (overdrive stage) and a reverse stage according to various combinations of engagement and disengagement of the three clutches C1, C2 and C3 and three brakes B1, B2 and B3. The various combinations of engagement and disengagement of the clutches and the brakes are shown in the table of FIG. 2. In this table a circle indicates that the corresponding clutch or brake is engaged when providing the corresponding shift stage.

The gear ratios provided in the respective shift stages are also shown in the table of FIG. 2. Here r1 is the ratio of the number of teeth of the sun gear 11 to that of the ring gear 13, and r2 is the ratio of the number of teeth of the sun gear 21 to that of the ring gear 23. In the table of FIG. 2 the numerical values of the gear ratios at the respective shift stages are given for an example that r1 equals 0.42 and r2 equals 0.69.

The operations of the speed change device shown in FIG. 1 according to the engagement and disengagement of the clutches and brakes according to the table of FIG. 2 will be described hereinunder for the respective shift stages.

First speed stage

Figure 3:
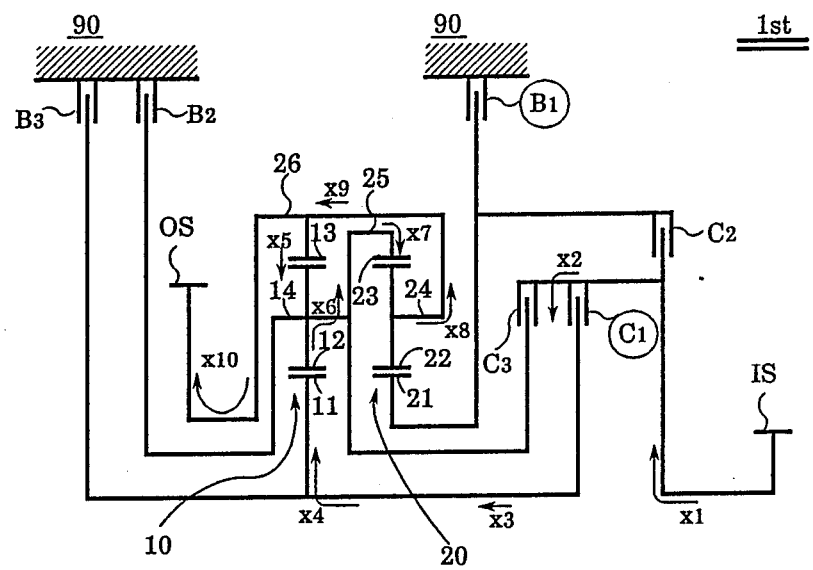
FIGS. 3-9 are views similar to FIG. 1, showing the flow of rotational power in the speed change device shown in FIG. 1 at various shift stages.

The speed change device is shifted to the first speed stage by engaging the clutch C1 and the brake B1. FIG. 3 shows the flow of the rotational power in the speed change device operating in this first speed stage. The rotational power supplied through the input rotational member Is is conducted as shown by arrows X1–X4 and is supplied to the sun gear 11 of the first planetary gear mechanism 10. This power is transmitted through the planetary pinions 12 and the carrier 14 to the ring gear 23 of the second planetary gear mechanism 20.

In the planetary gear mechanism 20 the sun gear 21 is braked against rotation by the brake B1. Therefore, the rotational power transmitted to the ring gear 23 flowed from the planetary gear mechanism 20 through the carrier 24. A part of this rotational power is recirculated through the ring gear 13 and the carrier 14 to the ring gear 23 and the remaining part of the rotational power is transmitted toward the output rotational member OS. These flows of the rotational power are shown by arrows by X5-X10. Thus the gear ratio as shown in the table of FIG. 2 is accomplished.

Second speed stage

Figure 4:
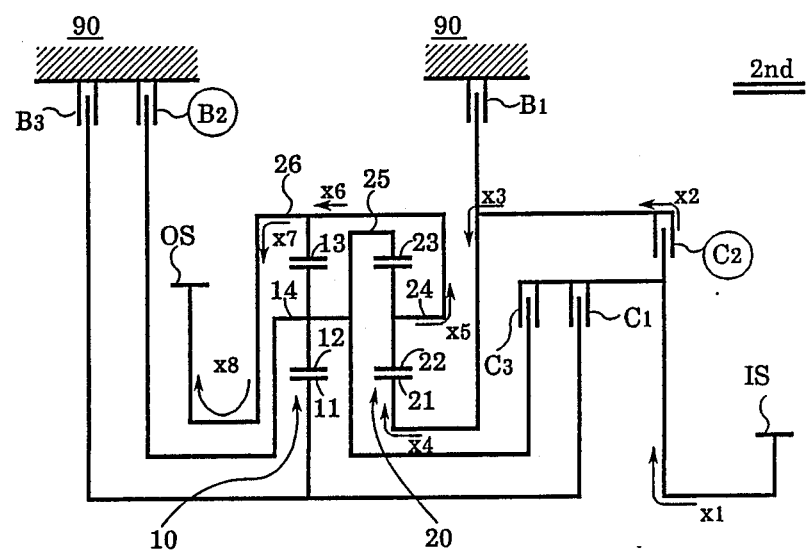

The speed change device is shifted to the second speed stage by engaging the clutch C2 and the brake B2. The flow of the rotational power in the operation at this shift stage is shown in FIG. 4. The rotational power supplied to the input rotational member IS is conducted as shown by arrows X1-X4 to the sun gear 21 of the planetary gear mechanism 20. In the planetary gear mechanism 20 the ring gear 23 is braked against rotation by the brake B2. Therefore, the rotational power supplied to the sun gear 21 flows out through the planetary pinions to the carrier 24 and is transmitted toward the output rotational member OS as shown by arrows X5-X8. The gear ratio is as shown in the table of FIG. 2.

Third speed stage

Figure 5:
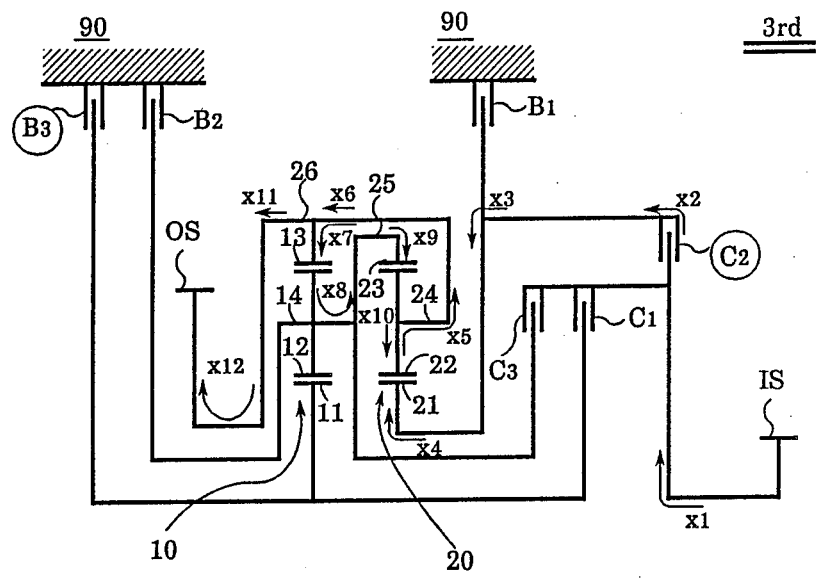

The speed change device is shifted to the third speed stage by engaging the clutch C2 and the brake B3. The flow of the rotational power is shown in FIG. 5. The rotational power supplied to the input rotational member IS is conducted as shown by arrows X1-X4 to the sun gear 21 of the planetary gear mechanism 20. The rotational power supplied to the sun gear 21 flows out through the carrier 24 toward the sun gear 13 of the planetary gear mechanism 10 as shown by arrows X5-X7. In the planetary gear mechanism 10 the sun gear 11 is braked against rotation by the brake B3, and therefore the rotational power transmitted to the ring gear 13 recirculates along the route shown by arrows X8-X10, while the resultant rotational power flows toward the output rotational member OS as shown by arrows X11-X12. The gear ration is as shown in the table of FIG. 2.

Fourth speed stage

Figure 6:
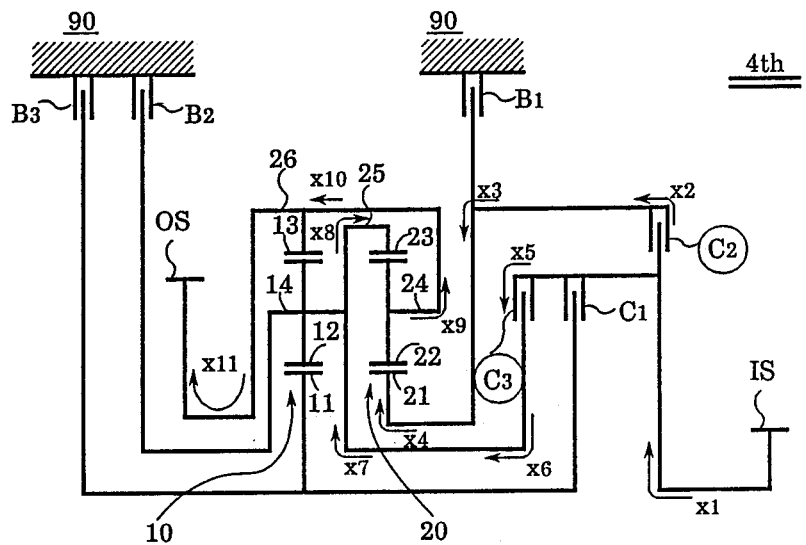

The speed change device is shifted to the fourth speed stage by engaging the clutches C2 and C3. The flow of the rotational power is shown in FIG. 6. The rotational power supplied to the input rotational member IS flows as shown by arrows X1-X4 toward the sun gear 21 as well as toward the ring gear 23 as shown by arrows X1,X5-X8 at the same rotational speed. Therefore, the second planetary gear mechanism 20 and therefore also the planetary gear mechanism 10 are locked up so as to rotate as a unitary body. Therefore, the rotational power supplied to the input rotational member IS is directly transmitted to the output rotational member OS as shown by arrows X9-X11. The gear ratio is of course 1 as shown in the table of FIG. 2.

Fifth speed stage

Figure 7:
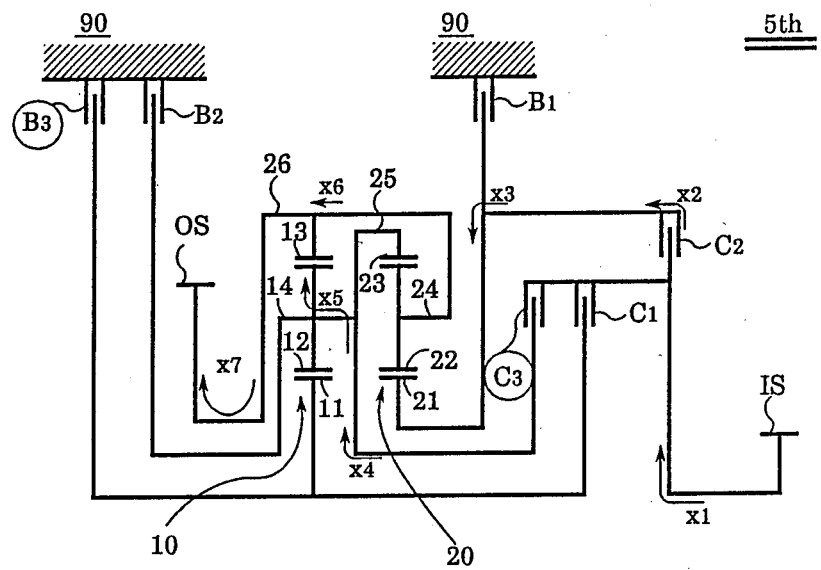

The speed change device is shifted to the fifth speed stage by engaging the clutch C3 and the brake B3. The flow of the rotational power is shown in FIG. 7. The rotational power supplied to the input rotational member IS flows as shown by arrows X1-X4 toward the carrier 14 of the planetary gear mechanism 10. In the planetary gear mechanism 10 the sun gear 11 is braked against rotation by the brake B3. Therefore, the rotational power supplied to the carrier 14 is transmitted through the planetary pinions 12 to the ring gear 13, and therefrom transmitted toward the output rotational member OS as shown by arrows X5-X7. The rotation of the carrier 14 also drives the ring gear 23 of the planetary gear mechanism 20. However, since the brake B1 and the clutch C2 are disengaged, the planetary gear mechanism 20 freewheels. Thus, an overdrive stage having the gear ratio as shown in the table of FIG. 2 is obtained.

Reverse stage

Figure 8:
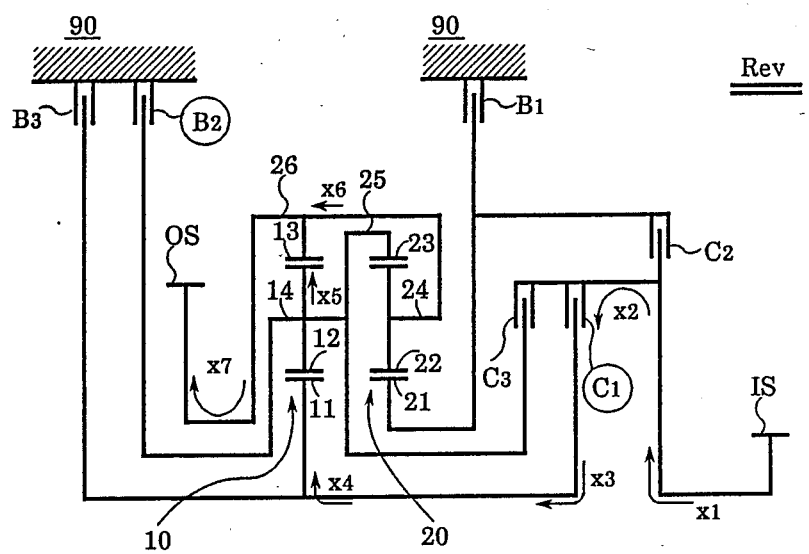

The speed change device is shifted to the reverse stage by engaging the clutch C1 and the brake B2. The flow of the rotational power is shown in FIG. 8. The rotational power supplied to the input rotational member Is is conducted as shown by arrows X1-X4 toward the sun gear 11 of the planetary gear mechanism 10. In the planetary gear mechanism 10 the carrier 14 is braked against rotation by the brake B2. Therefore, the rotational power supplied to the sun gear 11 is conducted through the planetary pinions 12 to the ring gear 13 and is transmitted toward the output rotational member OS as shown by arrows X5-X7. The output rotational member OS rotates in the reversed direction and this is shown by the negative gear ratio in the table of FIG. 2.

Figure 9:
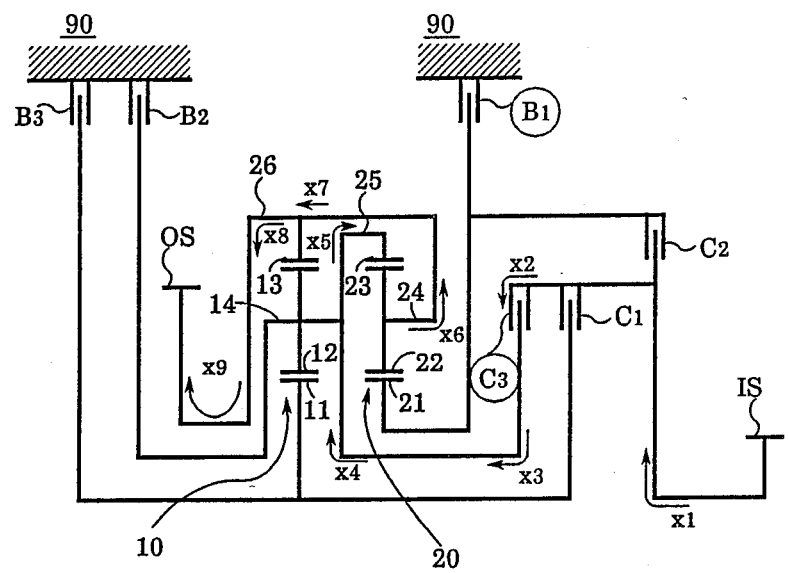

The speed change device having the structure shown in FIG. 1 can also be shifted to another speed stage by engaging clutch C3 and the brake B1. The flow of the rotational power in such an operation is shown in FIG. 9. The rotational power supplied to the input rotational member IS is transmitted to the ring gear 23 of the planetary gear mechanism 20 as shown by arrows X1-X5. In the planetary gear mechanism 20 the sun gear 21 is braked against rotation by the brake B1. Therefore, the rotational power supplied to the ring gear 23 is conducted through the planetary pinions 22 to the carrier 24 and is transmitted to the output rotational member OS as shown by arrows X6-X9. The rotational power transmitted through the clutch C3 also drives the carrier 14 of the planetary gear mechanism 10. However, since the clutch C1 and the brake B3 are disengaged, the planetary gear mechanism 10 freewheels. In the above-mentioned operation the speed change device provides the gear ratio of $1+r2$. When r2 is 0.69 as in the example shown in the table of FIG. 2 the value of the gear ratio $1+r2$ is 1.690. This gear ratio is positioned between the above-described second speed stage and the third speed stage. Therefore, the speed change device shown in FIG. 1 is also operable to provide six forward speed stages if desired. Alternatively, this speed stage of the gear ratio of $1+r2$ may be used to replace the second speed stage of the gear ratio of $(1+r2)/r2$ so that the example of a series of gear ratios shown in table in FIG. 2 is modified to a series of 3.333, 1.690, 1.429, 1.000 and 0.704.

Figure 10:
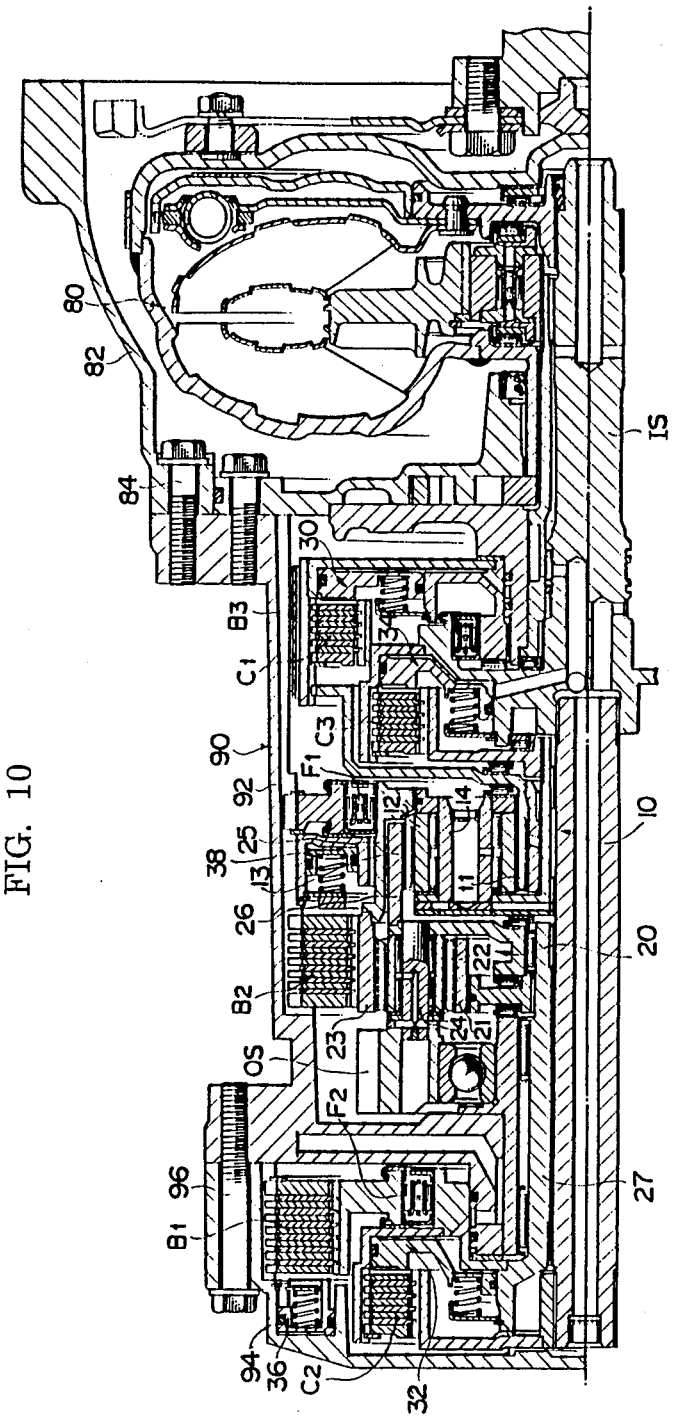
FIG. 10 is a longitudinal sectional view showing a more concrete structure of a speed change device which has the same fundamental structure as that shown in FIG. 1.

A more concrete structure of the speed change device shown in FIG. 1 is shown in FIG. 10 as incorporated with a fluid torque converter in a transmission for a vehicle such as an automobile. The arrangement with regard to the planetary gear mechanism 10 having the sun gear 11, the planetary pinions 12, the ring gear 13 and the carrier 14, the planetary gear mechanism 20 having the sun gear 21, the planetary pinions 22, the ring gear 23 and the carrier 24, the clutches C1, C2 and C3 and brakes B1 and B2 are of course fundamentally the same as that of the speed change device shown in FIG. 1. However, the speed change device shown in FIG. 10 further includes two so-called one-way clutches F1 and F2 which in fact are arranged to operated as one-way brakes, and further the apparent relative arrangement of the constructional members in the structure shown in FIG. 10 is somewhat different from that of the structure shown in FIG. 1.

Figures 11, 12:
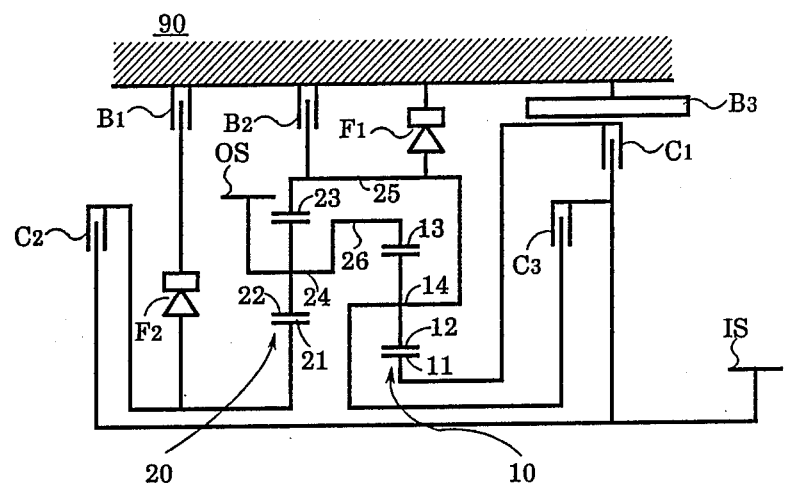
FIG. 11 is a diagrammatical view similar to FIG. 1 more faithful to the arrangement of structural members in the speed change device shown in FIG. 10.
FIGS. 12-19 are views similar to FIG. 11, showing the flow of rotational power in the speed change device shown in FIG. 11 at various shift stages.

FIG. 11 shows the structure of the speed change device shown in FIG. 10 in the same diagrammatical manner as FIG. 1. As noted in FIG. 11, the apparent relative position between the planetary gear mechanism 10 and the planetary gear mechanism 20 is reversed as compared with FIG. 1, and the apparent relative positions of the clutch C2 and the brakes B1 and B3 are also reversed. However, it will be noted that such positional reversals are only apparent changes and the structure shown in FIG. 11 is exactly the same as that of FIG. 1 as a fundamental structure gear train construction, except that additional incorporation of the one-way clutches F1 and F2.

The one-way clutch or brake F1 is provided in parallel with the brake B2 between the combination of the carrier 14 and the ring gear 23 by the connecting member 25 and the transmission case 90. The one-way clutch F2 is provided in series with the brake B1 in the structure for selectively braking the sun gear 21 with respect to the transmission case 90. Therefore, the one-way clutch F2 may also be called as a one-way brake.

In the transmission shown in FIG. 10, the transmission case 90 is connected with a torque converter case 82 enclosing a fluid torque converter 80. The input rotational member IS of the speed change device is connected with an output rotational member of the torque converter, i.e. the turbine thereof.

The transmission shown in FIG. 10 or 11 is shifted to various shift stages by engagement and disengagement of the clutches C1, C2 and C3 and the brakes B1, B2 and B3 as shown in the table of FIG. 12. The one-way clutches or brakes F1 and F2 are automatically engaged or disengaged as shown in the table of FIG. 12. In the table of FIG. 12 a circle also shows the corresponding clutch, brake or one-way clutch is engaged at the corresponding shift stage. A circle in parentheses (o) indicates that the corresponding brake B2 is engaged when engine braking is desired at the corresponding second speed stage. A circle in brackets [o] indicates that the corresponding brake B1, when engaged at the corresponding shift stages, is nullified by the slipping action of the one-way clutch F2 disposed in series therewith. The circles in solid lines for the one-way clutches or brakes F1 and F2 indicate that the corresponding one-way clutch or brake is engaged at the corresponding speed stage when the speed change device is operating in the engine driving condition, while the circle shown in a broken line indicates that the corresponding one-way clutch or brake is engaged when the speed change device operates under engine braking condition.

The gear ratios at the respective shift stages are of course the same as those in the structure shown in FIG. 1.

The operations of the speed change device shown in FIG. 11 will be described hereinunder.

First speed stage

Figure 13:
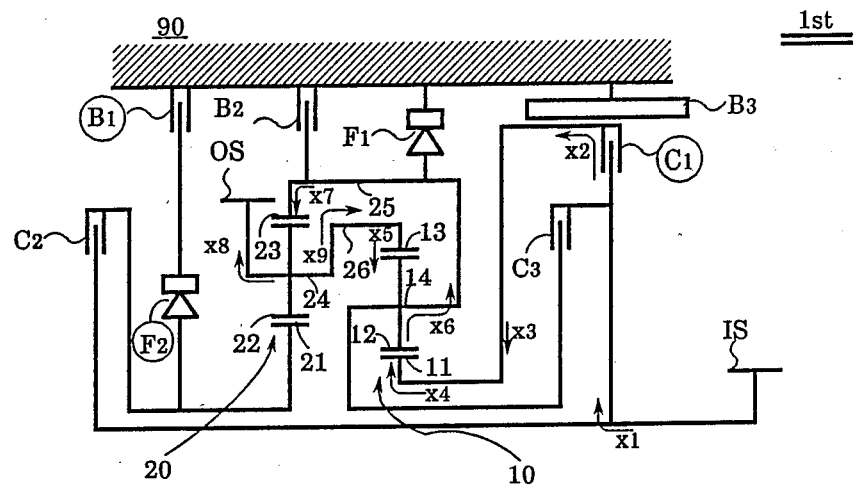

The speed change device is shifted to the first speed stage by engaging the clutch C1 and the brake B1. The one-way clutch or brake F2 is automatically put into engagement. the flow of rotational power in the speed change device is shown in FIG. 13. The rotational power supplied to the input rotational member IS is transmitted along the route shown by arrows X1–X4 to the sun gear 11 of the planetary gear mechanism 10. The rotational power supplied to the sun gear 11 is transmitted through the planetary pinions 12 to the carrier 14 and further therethrough to the ring gear 23 to the planetary gear mechanism 20 as shown by arrows X5–X7. In the planetary gear mechanism 20 the sun gear 21 is braked against rotation by the brake B1 and the one-way clutch or brake F2. Therefore, a part of the rotational power transmitted to the ring gear 23 is transferred from the ring gear 23 to the carrier 24 flows out toward the output rotational member OS as shown by arrow X8, while the remaining part is recirculated through the ring gear 13 and the carrier 14 to the ring gear 23 as shown by arrow X9.

When the speed change device is driven in the reversed direction from the output rotational member OS, the one-way clutch or brake F2 slips thereby releasing the sun gear 21 from the braked state. Since the clutch C2 is disengaged, the rotational power inputted to the output rotational member OS only free wheels the sun gear 21 and no engine braking is effected.

Second speed stage

Figure 14:
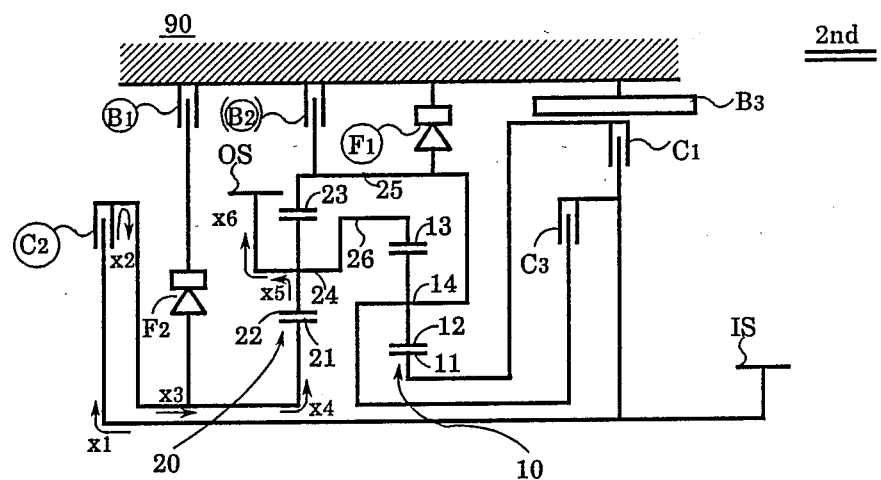
Figure 15:
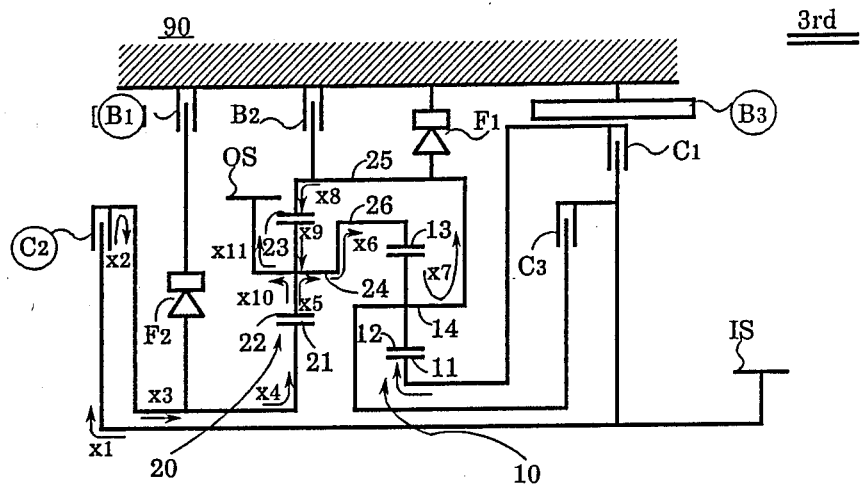
Figure 16:
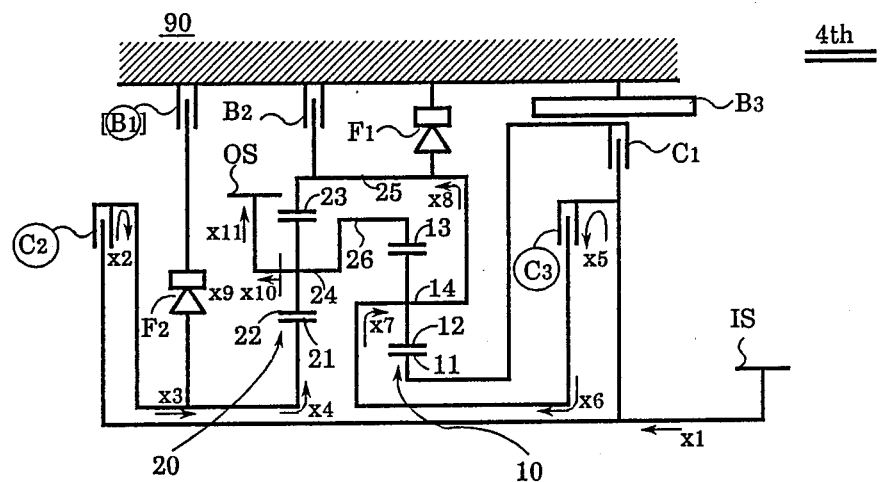
Figure 17:
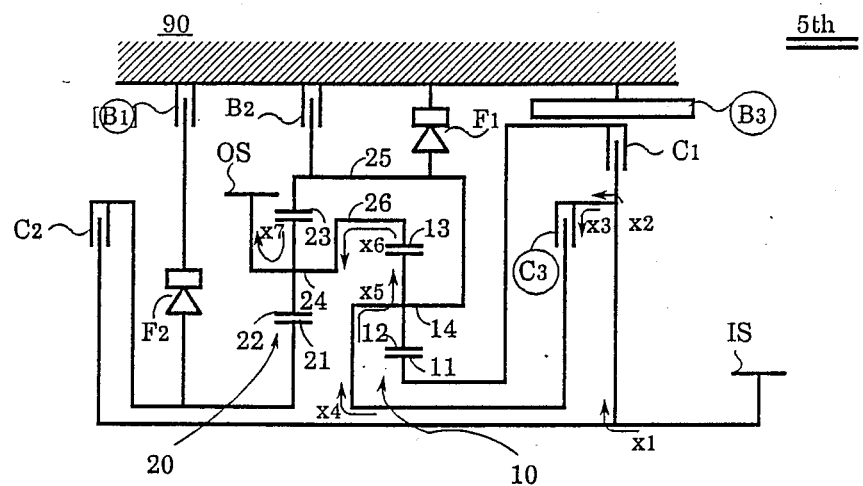
Figure 18:
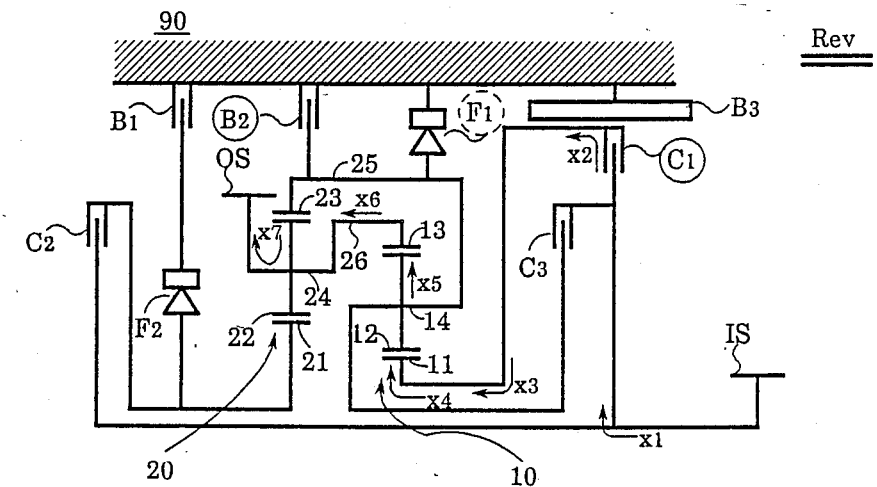

The speed change device is shifted to the second speed stage by engaging only clutch C2. When the speed change device is shifted from the first speed stage to the second speed stage, the brake B1 engaged for the first speed stage may be left in the engaged state because the engagement of the brake B1 is nullified by the one-way clutch or brake F2. The flow of the rotational power in the second speed stage operation is shown in FIG. 14. The rotational power supplied to the input rotational member IS is transmitted through the route shown by arrows X1–X4 to the sun gear 21 of the planetary gear mechanism 20. In the planetary gear mechanism 20 the ring gear 23 is braked against rotation in the forward rotational direction by the automatic engagement of the one-way clutch or brake F1. Therefore, the rotational power supplied to the sun gear 21 flows through the planetary pinions 22 to the carrier 24 toward the output rotational member OS as shown by arrows X5–X6.

When the speed change device is driven in the reversed direction from the output rotational member OS, the one-way clutch or brake F1 slips, and therefore the rotational power inputted to the output rotational member OS only free wheels the speed change device, and no engine braking is effected.

When the brake B2 disposed in parallel with the one-way clutch or brake F1 is engaged, the ring gear 23 is braked against rotation in opposite rotational directions, and therefore the rotational power inputted to the output rotational member OS is transmitted in the reversed direction against arrows X6–X1 so as to drive the input rotational member IS in the forward direction, so that engine braking is effected.

The speed change device shown in FIG. 11 operates in the third speed stage, the fourth speed stage, the fifth speed stage and the reverse stage in the same manner as the speed change device shown in FIG. 1. The flow of the rotational power in the operations at these shift stages are shown in FIGS. 15, 16, 17 and 18 for the convenience of reference. Therefore, further detailed descriptions will be omitted in order to avoid any redundancy of the description. However, as will be noted from the table of FIG. 12, the brake B1 may be maintained in the engaged state all through the second, third, fourth and fifth speed stages as nullified by the one-way clutch or brake F2. Further, in the reverse stage the one-way clutch or brake F1 is engaged when the speed change device is attempted to be driven in the reversed direction from the output rotational member OS.

Figure 19:
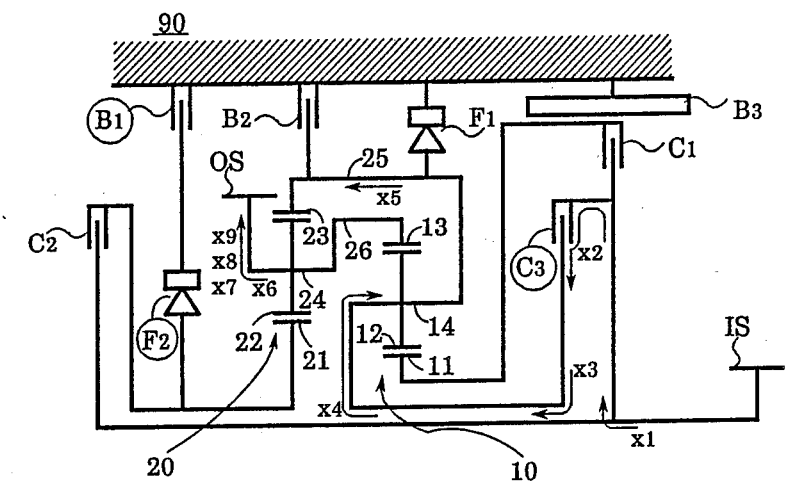

The speed change device shown in FIG. 11 can also provide another speed stage by engaging the clutch C3 and the brake B1 with the one-way clutch or brake F2 being also automatically engaged, said another speed stage having the gear ratio 1+r2 like the shift stage shown in FIG. 9. The flow of the rotational power in this speed stage operation is shown in FIG. 19. In this speed stage, when the speed change device is driven from the output rotational member OS in the reversed direction, the sun gear 21 is released from braking by the one-way clutch or brake F2, and therefore the speed change device freewheels.

The speed change device shown in FIG. 11 is a modification of the basic structure of the speed change device according to the present invention shown in FIG. 1 by the addition of the one-way clutch or brake F1 disposed in parallel with the brake B2 and the one-way clutch or brake F2 disposed in series with the brake B1. FIG. 20 shows other modifications applicable to the basic construction of the speed change device shown in FIG. 1 in the form of a list showing various alternative forms of the clutches and the brakes. In the list of FIG. 20 the symbols mean the switching over devices having such functions as described hereinunder:

: clutch or brake

: one-way clutch or brake which becomes engaged when an inner or outer race thereof connected with the power input side in engine driving attempts to rotate faster than an outer or inner race thereof connected with the power output side in engine driving : one-way clutch or brake which becomes engaged when an inner or outer race thereof connected with the power output side in engine driving attempts to rotate faster than an outer or inner race thereof connected with the power input side in engine driving : a series connection of the above-described clutch or brake and the above-described one-way clutch or brake : a parallel combination of the above-described clutch or brake and the above-described one-way clutch or brake : band brake : a parallel combination of two band brakes oriented in opposite directions with regard to the direction of self-tightening or self-loosening In the list of FIG. 20, column C shows that the switching over devices therein shown may be used for the clutches or brakes shown in column A which are operated in the shift stages shown in column B. In this connection, although the clutch C1 is not engaged according to the tables of FIGS. 2 and 12, since the fourth speed stage is the direct drive stage in which the two planetary gear mechanisms 10 and 12 are locked up so as to rotate as a unitary body, the clutch C1 may be engaged in the fourth speed stage operation. Column D shows that the shiftings between the speed stages therein shown are performed with no need of the timing control for the overlapping between a switching over device to be released and a switching over device to be engaged by replacing a simple clutch or brake by the complex switching over devices as shown in column C. Column E shows parallel combinations of switching over devices desirable for the respective clutches and brakes when engine braking is required. Column F shows examples of complex switching over devices employable for the respective clutches and brakes. In the list of FIG. 20 the speed stage "2'" means the speed stage obtained by the engagement of the clutch C2 and the brake B1 as shown in FIG. 9 or in FIG. 19.

Referring back again to FIG. 10 a profitable feature of the transmission case 90 therein shown will be described.

The transmission case 90 includes a main case 92 and a sub case 94 detachably mounted to one end of the main case 92. The main case 92 is combined with a converter case 82 at the other end thereof.

The main case 92 encloses therein the two planetary gear mechanisms 10 and 20, the clutch C1 and an oil hydraulic servo device 30 therefor, the clutch C3 and an oil hydraulic servo device 33 therefor, the brake B2 and an oil hydraulic servo device 38 therefor, the brake B3, the one-way clutch or brake F1, the output rotational member (gear wheel) OS, and the input rotational member IS disposed along the central axis of the transmission.

The sub case 94 encloses therein the clutch C2 and an oil hydraulic servo device 92 therefor, the brake B1 and an oil hydraulic servo device 36 therefor, and the one-way clutch or brake F2. The series combination of the brake B1 and the one-way clutch or brake F2 is connected with the sun gear 21 by a tubular intermediate shaft 27 disposed along the central axis of the transmission case to extend from the inside region of the main case 92 to the inside region of the sub case 94.

According to the above construction the parts to be enclosed in the main case 92 can be assembled into the main case 92 through the opening thereof at the right hand side as viewed in FIG. 10, while the parts to be enclosed in the sub case 94 can be assembled into the sub case 94 independently of the process of assembling the parts in the main case 92, and thereafter the sub assembly by the sub case 94 can be assembled to the assembly provided by the main case 92 with the intermediate shaft 27 being incorporated to extend therebetween. By this arrangement the accuracy of assemblage of the brake B1 which operates to provide the lowest speed stage and is therefore subject to the largest torque is improved while allowing increased design option.

Although the invention has been described and illustrated in the form of some preferred embodiments thereof, it will be understood by those skilled in the art that various modifications are possible with these embodiments without departing from the spirit of the present invention.

We claim:

1. A planetary gear type speed change device comprising:
   a case;
   an input rotational member;
   an output rotational member;
   a first planetary gear mechanism having a first sun gear, first planetary pinions, a first ring gear and a first carrier;
   a second planetary gear mechanism having a second sun gear, second planetary pinions, a second ring gear and a second carrier;
   a first connecting member connecting said first carrier with said second ring gear;
   a second connecting member connecting said second carrier with said first ring gear; and
   a plurality of friction engaging means selectively engaged and disengaged for changing over a gear ratio between said input rotational member and said output rotational member, including:

a first clutch for selectively connecting said first sun gear with said input rotational member;

a second clutch for selectively connecting said second sun gear with said input rotational member;

a third clutch for selectively connecting the combination of said first carrier and said second ring gear by said first connecting member with said input rotational member;

a first brake for selectively braking said second sun gear with respect to said case;

a second brake for selectively braking the combination of said first carrier and said second ring gear by said first connecting member with respect to said case;

a third brake for selectively braking said first sun gear with respect to said case; and a one-way brake disposed in series with said first brake between said first brake and said second sun gear so as to selectively brake said second sun gear with respect to said case in a forward rotational direction when said first brake is engaged while slipping in a reversed rotational direction opposite to said forward rotational direction;

said output rotational member being connected with the combination of said second carrier and said first ring gear by said second connecting member.

2. A planetary gear type speed change device according to claim 1, further comprising a one-way brake for selectively braking the combination of said first carrier and said second ring gear by said first connecting member with respect to said case in a forward rotational direction while slipping in a reversed rotational direction opposite to said forward rotational direction.

3. A planetary gear type speed change device according to claim 1, wherein said first brake is positioned on a first axial side of said output rotational member opposite to a second axial side thereof, a combination of said first and second planetary gear mechanisms with said first and second connecting members being positioned on said second axial side of said output rotational member.

4. A planetary gear type speed change device comprising:

a case;

an input rotational member;

an output rotational member;

a first planetary gear mechanism having a first sun gear, first planetary pinions, a first ring gear and a first carrier;

a second planetary gear mechanism having a second sun gear, second planetary pinions, a second ring gear and a second carrier;

a first connecting member connecting said first carrier with said second ring gear;

a second connecting member connecting said second carrier with said first ring gear; and a plurality of friction engaging means selectively engaged and disengaged for changing over a gear ratio between said input rotational member and said output rotational member, including:

a first clutch for selectively connecting said first sun gear with said input rotational member;

a second clutch for selectively connecting said second sun gear with said input rotational member;

a third clutch for selectively connecting the combination of said first carrier and said second ring gear by said first connecting member with said input rotational member;

a first brake for selectively braking said second sun gear with respect to said case;

a second brake for selectively braking the combination of said first carrier and said second ring gear by said first connecting member with respect to said case;

a third brake for selectively braking said first sun gear with respect to said case; and a first one-way brake for selectively braking the combination of said first carrier and said second ring gear by said first connecting member with respect to said case in a forward rotational direction while slipping in a reversed rotational direction opposite to said forward rotational direction, and a second one-way brake disposed in series with said first brake between said first brake and said second sun gear so as to selectively brake said second sun gear with respect to said case in a forward rotational direction when said first brake is engaged while slipping in a reversed rotational direction opposite to said forward rotational direction;

said output rotational member being connected with the combination of said second carrier and said first ring gear by said second connecting member.

5. A planetary gear type speed change device according to claim 4, wherein said first planetary gear mechanism and said second planetary gear mechanism are positioned axially adjacent with one another along a central axis of the speed change device, said first clutch and said second clutch are positioned on one axial side of said first planetary gear mechanism remote from said second planetary gear mechanism, and said second clutch, said first brake and said second one-way brake are positioned as a sub-assembly on one axial side of said second planetary gear mechanism remote from said first planetary gear mechanism, said input rotational member including a shaft portion extending along said central axis from said one side of said first planetary gear mechanism remote from said second planetary gear mechanism to said one side of said second planetary gear mechanism remote from said first planetary gear mechanism.

6. A planetary gear type speed change device according to claim 5, wherein said output rotational member is an annular member positioned coaxially about said shaft portion of said input rotational member between said second planetary gear mechanism and said sub-assembly of said second clutch, said first brake and said second one-way brake.

7. A planetary gear type speed change device according to claim 6, wherein said case includes a first case unit for enclosing therein said first and second planetary gear mechanisms, said first and third clutches, said second and third brakes and said first one-way brake, and a second case unit for enclosing therein said sub-assembly of said second clutch, said first brake and said second one-way brake, said second case unit being detachably mounted to an adjacent axial end of said first case unit.

* * * * *